(12) United States Patent
Barra et al.

(10) Patent No.: US 11,774,572 B2
(45) Date of Patent: Oct. 3, 2023

(54) METHOD AND SYSTEM FOR MEASURING THE VELOCITY OF A CARRIER WITH RESPECT TO THE GROUND

(71) Applicant: COMMISSARIAT A L'ENERGIE ATOMIQUE ET AUX ENERGIES ALTERNATIVES, Paris (FR)

(72) Inventors: Jérémy Barra, Grenoble (FR); Olivier Debicki, Grenoble (FR); Suzanne Lesecq, Grenoble (FR); Nicolas Mareau, Grenoble (FR); Laurent Ouvry, Grenoble (FR); Mykhailo Zarudniev, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 278 days.

(21) Appl. No.: 16/721,773

(22) Filed: Dec. 19, 2019

(65) Prior Publication Data
US 2020/0200891 A1 Jun. 25, 2020

(30) Foreign Application Priority Data
Dec. 20, 2018 (FR) ...................... 1873484

(51) Int. Cl.
*G01S 13/60* (2006.01)
*B60R 11/00* (2006.01)
(Continued)

(52) U.S. Cl.
CPC .............. *G01S 13/60* (2013.01); *B60R 11/00* (2013.01); *G01S 15/60* (2013.01); *G01S 13/18* (2013.01);
(Continued)

(58) Field of Classification Search
CPC ...... G01S 13/882; G01S 13/18; G01S 13/524; G01S 13/60; G01S 13/931; G01S 13/589; G01S 13/64; G01S 15/60
(Continued)

(56) References Cited

U.S. PATENT DOCUMENTS 5,243,564 A   9/1993  Ikeda et al.
5,311,183 A *  5/1994  Mathews .............. G01S 13/953
                                                          342/26 B
(Continued)

FOREIGN PATENT DOCUMENTS

EP   1 739 451 A1   1/2007
EP   3 054 316 A1   8/2016
FR   2 741 957 A1   6/1997

OTHER PUBLICATIONS

Radar Principles by Prof. David Jenn at Dept. of Electrical & Computer Engineering at Naval Postgraduate School. (Year: 2017).*
(Continued)

*Primary Examiner* — Vladimir Magloire
*Assistant Examiner* — Michael W Justice
(74) *Attorney, Agent, or Firm* — BakerHostetler

(57) ABSTRACT

A method for measuring, using a radar or sonar, the velocity with respect to the ground of a carrier moving parallel to the ground, includes the following steps: a) orienting the line of sight of the radar or sonar toward the ground; b) emitting a plurality of radar or sonar signals ($P_1$-$P_N$) that are directed toward the ground, and acquiring respective echo signals ($E_1$-$E_N$); c) processing the acquired echo signals so as to obtain, for one or more echo delay values, a corresponding Doppler spectrum; d) for the or at least one the echo delay value, determining a high cut-off frequency of the corresponding Doppler spectrum; and e) computing the velocity of the carrier with respect to the ground on the basis of the
(Continued)

one or more high cut-off frequencies. A system allowing such a method to be implemented.

10 Claims, 6 Drawing Sheets

(51) Int. Cl.
    *G01S 15/60*     (2006.01)
    *G01S 13/64*     (2006.01)
    *G01S 13/18*     (2006.01)
    *G01S 13/524*    (2006.01)
    *G01S 13/58*     (2006.01)
    *G01S 13/931*    (2020.01)
    *G01S 13/88*     (2006.01)
(52) U.S. Cl.
    CPC .......... *G01S 13/524* (2013.01); *G01S 13/589* (2013.01); *G01S 13/64* (2013.01); *G01S 13/882* (2013.01); *G01S 13/931* (2013.01)
(58) Field of Classification Search
    USPC .......................................... 342/115, 104, 418
    See application file for complete search history.

(56) References Cited

U.S. PATENT DOCUMENTS

| | | | | |
|---|---|---|---|---|
| 5,751,241 | A * | 5/1998 | Lewiner | G01S 13/60 342/111 |
| 6,580,392 | B2 * | 6/2003 | Yu | H04K 3/224 342/417 |
| 6,703,966 | B2 * | 3/2004 | Corbrion | G01S 13/60 342/194 |
| 7,151,479 | B2 * | 12/2006 | Beez | H01Q 1/3233 342/174 |
| 7,310,061 | B2 * | 12/2007 | Nagasaku | G01S 13/60 342/115 |
| 7,532,153 | B2 * | 5/2009 | Nagasaku | G01S 7/032 342/115 |
| 7,911,375 | B2 * | 3/2011 | Winstead | G01C 5/005 342/99 |
| 8,519,882 | B2 * | 8/2013 | Huizing | G01S 7/414 342/25 R |
| 9,229,024 | B2 * | 1/2016 | Carpaij | G01S 17/931 |
| 9,304,198 | B1 * | 4/2016 | Doerry | G01S 19/53 |
| 9,713,012 | B2 * | 7/2017 | Farshchian | G01S 7/023 |
| 9,746,549 | B1 * | 8/2017 | Parker | G01S 7/292 |
| 9,864,053 | B2 * | 1/2018 | Winstead | G01S 13/882 |
| 9,939,524 | B2 * | 4/2018 | Winstead | G01S 13/18 |
| 10,921,444 | B2 * | 2/2021 | Henderson | G01C 21/1652 |
| 2003/0052814 | A1 * | 3/2003 | Corbrion | G01S 13/60 342/115 |
| 2003/0071749 | A1 * | 4/2003 | Yu | G01S 7/2813 342/107 |
| 2005/0116854 | A1 * | 6/2005 | Beez | H01Q 19/062 342/107 |
| 2006/0139206 | A1 * | 6/2006 | Nagasaku | H01Q 19/062 342/115 |
| 2008/0091380 | A1 * | 4/2008 | Nagasaku | H01Q 15/08 702/142 |
| 2010/0204867 | A1 * | 8/2010 | Longstaff | G01S 13/933 701/26 |
| 2010/0302088 | A1 * | 12/2010 | Winstead | G01S 13/882 342/120 |
| 2011/0133979 | A1 * | 6/2011 | Huizing | G01S 13/536 342/29 |
| 2012/0016615 | A1 * | 1/2012 | Carpaij | G01S 17/58 702/96 |
| 2016/0223665 | A1 * | 8/2016 | Winstead | G01S 13/882 |
| 2017/0026847 | A1 * | 1/2017 | Farshchian | G01S 7/021 |
| 2017/0350971 | A1 * | 12/2017 | Winstead | G01S 7/354 |
| 2018/0045814 | A1 * | 2/2018 | Slapak | G01S 13/66 |
| 2019/0086534 | A1 * | 3/2019 | Frick | G01S 13/582 |
| 2019/0170871 | A1 * | 6/2019 | Henderson | G01S 13/584 |
| 2021/0011147 | A1 * | 1/2021 | Va | G01S 13/72 |

OTHER PUBLICATIONS

Introduction to mmWave Sensing: FMCW Radar by Rao Sandeep for Texas Instruments (Year: 2023).*

Kleinhempel, et al., "Speed measure of vehicles with on-board Doppler radar", International Conference on Radar, 1992.

* cited by examiner

METHOD AND SYSTEM FOR MEASURING THE VELOCITY OF A CARRIER WITH RESPECT TO THE GROUND

CROSS-REFERENCE TO RELATED APPLICATIONS

This application claims priority to foreign French patent application No. FR 1873484, filed on Dec. 20, 2018, the disclosure of which is incorporated by reference in its entirety.

FIELD OF THE INVENTION

The invention relates to a method and system for measuring, using radar or sonar, the velocity of a carrier moving parallel to the ground. It lends itself to many applications, and notably to the measurement of the velocity of land vehicles (in particular motor vehicles) and aircraft, whether human-controlled or not, but also to the production of "electronic white sticks" for assisting the blind and visually impaired in their movements.

BACKGROUND

In the case of wheeled vehicles, the velocity with respect to the road is generally deduced from a measurement of the speed of rotation of the wheels. This approach is notoriously imprecise because the diameter of the wheels is not always exactly known; furthermore, the measurement is corrupted by the presence of slippage. It is not suitable for the case of vehicles other than wheeled vehicles, such as aircraft.

Another approach consists in using satellite positioning systems (i.e. GNSS acronym of Global Navigation Satellite Systems). The drawback of this approach is that it relies upon exterior infrastructure, which is not always available, for example in an urban or interior environment.

It is also known to carry out contactless velocity measurements without exterior infrastructure by means of a radar. The measurements are then generally based on the Doppler effect.

Document FR2741957 describes a radar allowing a measurement of distance and of velocity with respect to the ground to be obtained simultaneously. The radar, which may be a pulsed radar or a frequency-modulated continuous-wave (FMCW) radar, is fastened to a vehicle at a known distance D from the ground, its line of sight making, with the ground, an angle $\theta$ that is also known. A distance range corresponding to the distance of the radar to the ground is chosen. The width of this interval is relative to the aperture of the cone of the field of view of the radar used. During a velocity measurement, if the associated distance is not comprised in the range, it is discarded. This distance range varies depending on velocity measurements made beforehand. For example, if the preceding measurements revealed an acceleration of the vehicle, the maximum distance value is increased in order to take into account the acceleration of the vehicle. This interval makes it possible to use only velocity values that correspond to the echo from the ground and not values corresponding to other obstacles having a different relative velocity such as another vehicle. One drawback of this approach is that the velocity is calculated depending on the angle $\theta$, which is assumed to be known and constant. An error therefore occurs in the velocity value when the angle changes, as happens in the case of acceleration or braking.

Document U.S. Pat. No. 5,243,564 allows the effects of changes in angle to be corrected for. This document exploits the fact that there is a relationship between the deceleration of the vehicle and its attitude. The measurement of velocity by the radar is corrected by means of a device that uses the speed of rotation of the wheels delivered by an anti-locking system. The detection of braking leads to a measurement of acceleration, of the height of the radar with respect to the ground, of the attitude angle of the vehicle or of any parameter having a direct or indirect influence on the measurement of ground velocity. If the vehicle is not in the process of braking, the velocity is computed using the angle at rest. This approach applies only to the case of a wheeled vehicle equipped with an anti-locking system and is based on large assumptions as to the dynamics of the vehicle.

The article by Kleinhempel, W., D. Bergmann, and W. Stammler. "Speed measure of vehicles with on-board Doppler radar", International Conference on Radar, 1992, teaches that it is possible to make the velocity measurement independent of the angle between the line of sight and the ground using two radars the lines of sight of which are not parallel. The main drawback of this approach is its cost, because two radars are necessary.

SUMMARY OF THE INVENTION

The invention aims to overcome all or some of the aforementioned drawbacks of the prior art. More particularly, it aims to provide a simple and economical method and system for measuring, contactlessly, the velocity of a carrier with respect to the ground, without prior knowledge of the attitude of the carrier being necessary.

According to the invention, this aim is achieved by exploiting the fact that a radar (or sonar) has a cone for emitting and receiving waves of finite width. Thus, the detected echoes contain enough information to allow the angle of sight and the height of the carrier with respect to the ground to be computed, this in turn allowing the velocity measurement to be corrected using the Doppler effect. It is therefore not necessary to use a second radar, an anti-locking system or an inertial measurement unit.

One subject of the invention is therefore a method for measuring the velocity of a carrier with respect to the ground, the carrier moving parallel to the ground and being equipped with a radar or sonar having an emission and reception cone about a line of sight, the method comprising the following steps:
a) orienting the line of sight of the radar or sonar toward the ground, preferably obliquely, such that a footprint on the ground of said emission and reception cone is passed through by the projection onto the ground of the velocity vector of the carrier;
b) using the radar or sonar to emit a plurality of signals that are directed toward the ground, and to acquire respective echo signals;
c) processing the acquired echo signals so as to obtain, for one or more echo delay values, a corresponding Doppler spectrum;
d) for said or at least one said echo delay value, determining a high, in absolute value, cut-off frequency of the corresponding Doppler spectrum; and
e) computing the velocity of the carrier with respect to the ground on the basis of its height with respect to the ground, of said one or more high cut-off frequencies and of the corresponding delay values.

Another subject of the invention is a system for measuring the velocity of a carrier with respect to the ground by means of a method as claimed in one of the preceding claims, comprising:

a radar or sonar having an emission and reception cone about a line of sight that is able to be oriented toward the ground; and an electronic device for processing echo signals acquired by said radar or sonar;

wherein said electronic device is configured to:

process the acquired echo signals so as to obtain, for one or more echo delay values, a corresponding Doppler spectrum;

for said or at least one said echo delay value, determine a high, in absolute value, cut-off frequency of the corresponding Doppler spectrum; and compute the velocity of the carrier with respect to the ground on the basis of a datum indicative of its height with respect to the ground, of said one or more high cut-off frequencies and of corresponding delay values.

Particular embodiments form the subject matter of the dependent claims.

BRIEF DESCRIPTION OF THE DRAWINGS

Other features, details and advantages of the invention will become apparent on reading the description given with reference to the appended drawings, which are given by way of example and show, respectively.

DETAILED DESCRIPTION

By carrier what is meant is any movable body capable of carrying a radar or sonar; it may for example be a land vehicle, a car for example, an aircraft or even a non-automotive object. The carrier may be moved with a horizontal translational movement and/or rotated about a vertical axis; this is for example the case with an electronic white stick, to which the user imparts a circularly arcuate movement. In the latter case, it is the velocity of the portion of the carrier on which the radar or sonar is mounted that is measured (the end of the white stick for example).

Below, solely the case of a radar will be considered, but the generalization to a sonar should in principle cause no difficulty.

Figure 1:
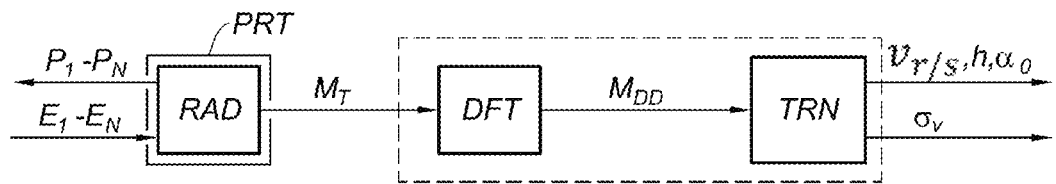
FIG. 1, a schematic showing the principle of a velocity measurement according to one embodiment of the invention.

The invention exploits measurements of time-of-flight and of Doppler shift to estimate both the distance from the ground and its velocity relative to the carrier. As illustrated in FIG. 1, a radar RAD fastened to a carrier PRT emits a succession of N>1 pulses $P_1$-$P_N$ in the direction of the ground, and receives corresponding echoes $E_1$-$E_N$. Each echo is sampled in the time domain (M>1 samples) and, in general, the complex amplitude of each sample is quantified in order to allow digital processing to be carried out. The number N of pulses is generally comprised between 10 and 100, and may for example be N=32 or N=64. The choice of N is made depending on the intended application, and in particular depending on the expected variations in the velocity of the carrier and on the expected maximum distance of obstacles. The larger this distance, the longer the dwell time after emission of a pulse (and therefore the lower the emission rate) must be. Furthermore, the dwell time and the number of pulses emitted and echoes received influence the precision of estimation of the velocity of a carrier that does not move at a constant velocity. The number M of samples for each echo depends on the sought-after distance resolution; for example, for a maximum distance of 3 m, if it is desired to obtain a precision of 1 cm, M must be greater than or equal to 300 (M≥300).

Thus, a matrix $M_T$ of N×M samples is obtained in the time domain; one dimension of the matrix corresponds to the "slow time", which is sampled via the emission rate of the pulses $P_1$-$P_N$, whereas the other corresponds to the "fast time", which is quantified at the sampling frequency of the echoes. A discrete Fourier transform DFT is then computed with respect to the slow-time dimension. This computation is typically carried out by means of a fast-Fourier-transform (FFT) algorithm. Thus, a second N×M matrix $M_{DD}$, called the delay/Doppler matrix, is obtained. Its name comes from the fact that the dimension corresponding to the fast time represents the delay T in reception of an echo signal with respect to the corresponding emission time, which delay is related to the radar/ground distance D by the relationship D=cT/2, c being the speed of propagation of the signal (speed of light in the case of a radar, speed of sound in the case of a sonar) whereas the dimension along which the Fourier transform is computed corresponds to the Doppler shift, which conveys velocity information. As a variant, it is possible to consider a range/Doppler matrix.

The case of a pulsed radar is the easiest to understand; however, a delay/Doppler matrix may also be obtained using other types of radar, for example frequency-modulated continuous-wave (FMCW) radars and radars using pulse compression. Such radars are also suitable for implementing the invention.

Figure 2:
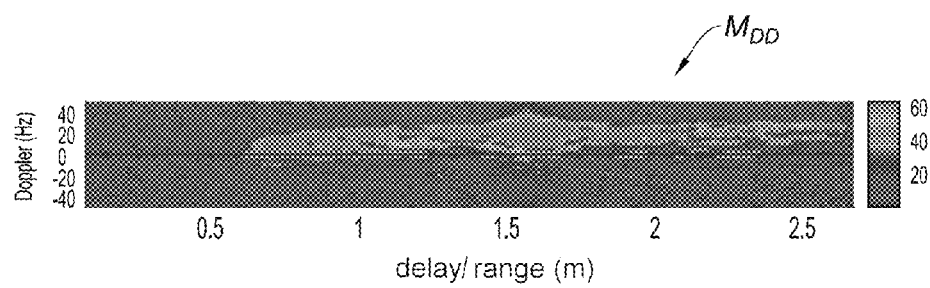
FIG. 2, a delay/Doppler (or, equivalently, range/Doppler) matrix obtained using a The method as claimed in one embodiment of the invention.

An example of a matrix $M_{DD}$ is illustrated in FIG. 2, in which each shade of gray corresponds to a value of the power of the signal received in one delay/Doppler box. In fact, in FIG. 2, the horizontal axis represents the distance from the ground and not the delay, but this is of no importance because these two quantities are related to each other by a constant of proportionality.

Digital processing of the matrix $M_{DD}$ allows not only the velocity $v_{r/s}$ of the radar/sonar with respect to the ground to be obtained, but also its height h and the angle $\alpha_0$ made by the ground (assumed to be flat) and the pointing direction of the radar. As a variant, the parameters h and $\alpha_0$ may be known, this allowing simplified processing operations to be used to determine $v_{r/s}$.

The digital processing operations are carried out by an electronic signal-processing device that may, for example, be or comprise a processor, for example a suitably programmed digital signal processor (DSP) and/or a dedicated circuit. The device has been represented by the reference DET in FIG. 1 and FIG. 3A. Typically, the device DET is located on-board the carrier, but it is also possible to transmit the radar or sonar measurements to a remote processing device.

Figure 3A:
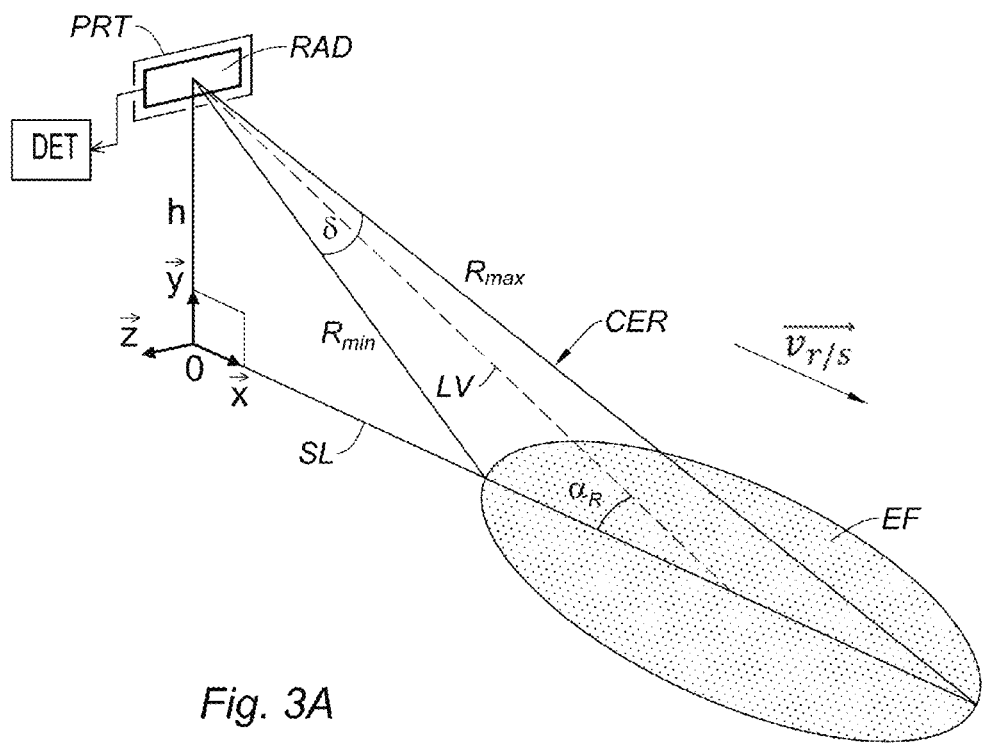
FIG. 3A, one three-dimensional view and to two-dimensional views of a velocity measurement configuration according to the invention.
Figure 3B:
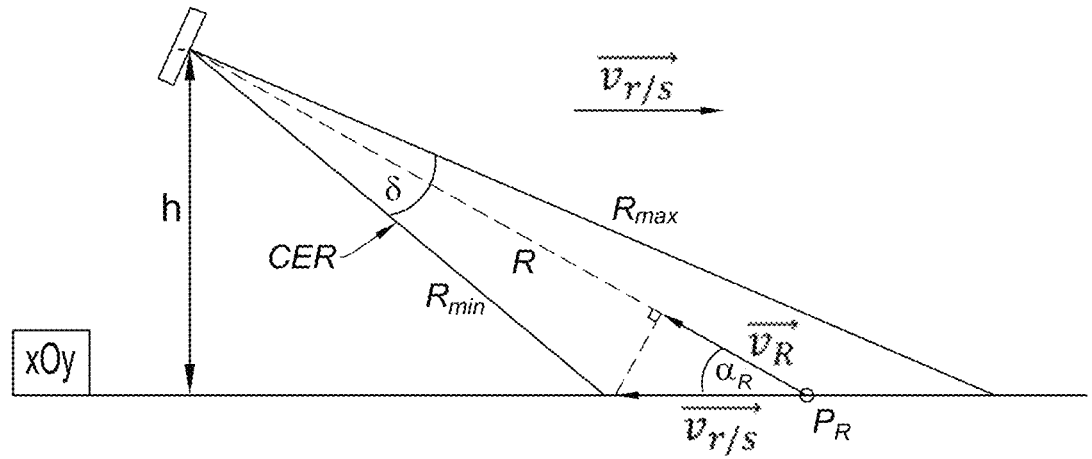
FIG. 3B, one three-dimensional view and two two-dimensional views of a velocity measurement configuration according to the invention.
Figure 3C:
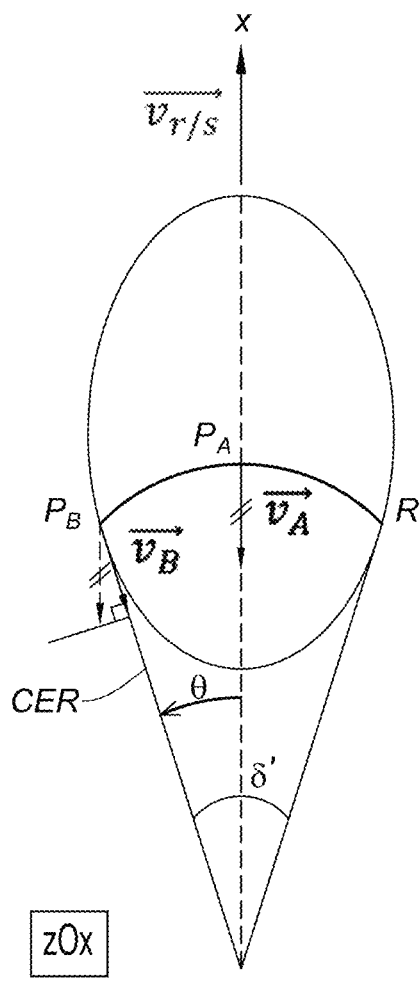
FIG. 3C, one three-dimensional view and two two-dimensional views of a velocity measurement configuration according to the invention.

FIG. 3A, FIG. 3B and FIG. 3C illustrate the geometric configuration used to perform a measurement of velocity $v_{r/s}$ according to the invention. The radar RAD is located at a height h with respect to the ground SL, which is considered to be flat, and moves at a velocity $v_{r/s}$ parallel to the latter. A Cartesian coordinate system is defined, with its origin O located on the ground and plumb with the radar; the y-axis corresponds to the vertical axis, and therefore the ground coincides with the xOz plane, the velocity $v_{s/r}$ being oriented in the positive direction of the z-axis. The line of sight LV of the radar lies in the xOy plane and makes, with the ground (and therefore with the x-axis) an angle $\alpha_0$ that is different from 0° and from 90° and preferably comprised between 20° and 70°. The larger the maximum measuring distance, the smaller the angle $\alpha_0$ may be.

The radar RAD emits pulses $P_i$ in an emission and reception cone CER that is centered on the line of sight AV and that has an aperture angle $\delta$ in the xOy plane (perpendicular to the ground) and $\delta'$ in the zOx plane (perpendicular to the ground). The footprint EF on the ground of the beam therefore has an elliptical shape. The invention takes into account the fact that the aperture angle of the beam is not generally negligible—it may for example be comprised between 10° and 80° and preferably between 40° and 60°, or even between 40° and 80°. In fact, as will become clear below, having a non-negligible angular aperture in the xOy plane is an advantage. Furthermore, too large an aperture angle—for example $\delta$ and/or $\delta'>80°$—is undesirable because the sidelobes of the radiation pattern would then disrupt the measurement.

In the example of FIGS. 3A-3C, the footprint EF does not extend up to plumb with the radar (point O). In other words, the aperture half-angle in the xOy plane, $\delta/2$, is smaller than $\alpha_0$. This is preferred, but not essential: if the point O is comprised in the footprint on the ground of the beam, the corresponding echo will have a zero Doppler shift and it will therefore be necessary to ignore it in the computation of the velocity (Equations 6 and 7 below take an indeterminate value "0/0" for such an echo). This results in additional complexity in the processing, as these problematic contributions must be excluded, and in a degradation in signal-to-noise ratio (because a fraction of the echo signal is not usable).

At the very most, the angle of inclination $\alpha_0$ could be equal to 90°, the line of sight being perpendicular to the ground; however, for the reasons given above, the use of a beam directed obliquely toward the ground is clearly preferred.

It may be seen that the various points in the footprint EF are located at different distances from the radar RAD, which is considered to be point-like; the extreme values taken by these distances are designated $R_{min}$ and $R_{max}$. The locus of the points in the footprint EF at a given distance from the radar is a circular arc (shown in FIG. 3C). The components of the echo signals $E_i$ ($i \in \{1, 2, \ldots, N\}$) emitted by points at different distances reach the radar at different times, this resulting in temporal spreading of the echoes.

Likewise, the radial component $v_R$ of the velocity $v_{r/s}$—and therefore the Doppler shift—is not the same for all the points in the footprint.

Figure 4:
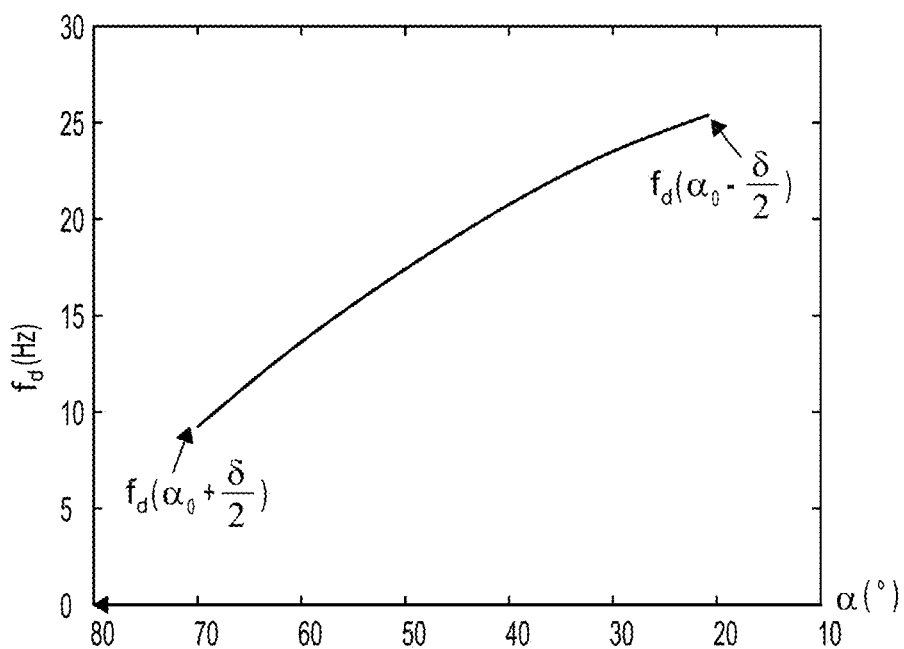
FIG. 4, graphs illustrating various data-processing operations allowing a velocity measurement to be extracted from a delay/Doppler matrix of the type illustrated in FIG. 2.

Considering the xOy plane, it may be seen from FIG. 3B that the radial velocity $v_R$ at any point $P_R$ of the footprint is the projection of the velocity $v_{s/r}$ onto the radius R—of length comprised between $R_{min}$ and $R_{max}$—connecting this point to the radar. If only points located on the x-axis are considered, it is found that $$v_R = v_{s/r} \cos(\alpha_R) \qquad \text{[Math. 3]}$$

where $$\alpha_R \in \left[\alpha_0 - \frac{\delta}{2}; \alpha_0 + \frac{\delta}{2}\right] \qquad \text{[Math. 4]}$$

is the angle made by the radius R and the x-axis. Furthermore $$\alpha_R = \sin^{-1}\left(\frac{h}{R}\right) = \sin^{-1}\left(\frac{2h}{c \cdot T_R}\right) \qquad \text{[Math. 5]}$$

where $T_R$ is the delay of echoes originating from a point at the distance R from the radar. It is therefore possible to plot a curve that, for points located on the x-axis, expresses the relationship between the Doppler frequency and the delay. This curve is illustrated in FIG. 4 and allows the spread of the spectrum of FIG. 2 in the "delay" direction to be understood.

Figure 5:
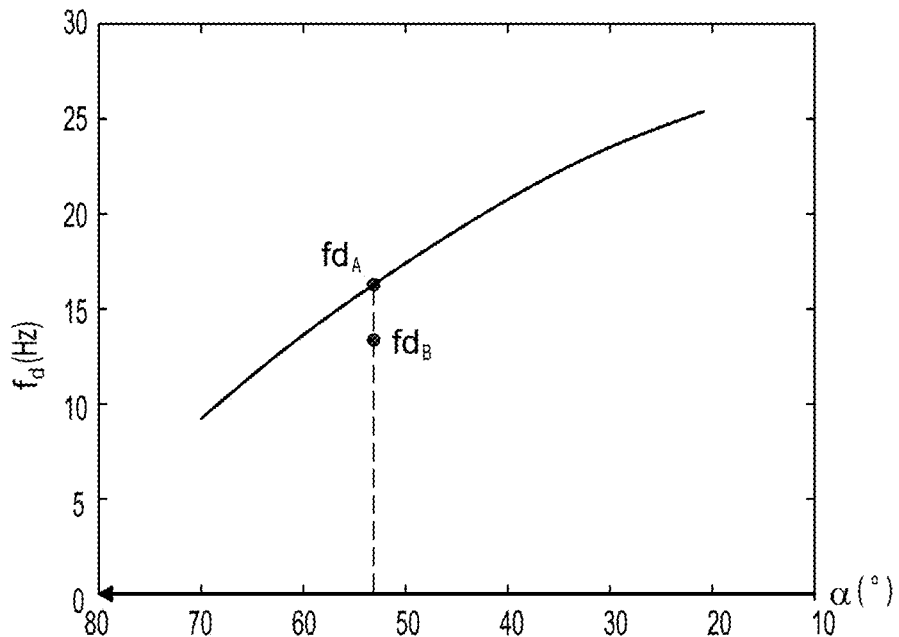
FIG. 5, graphs illustrating various data-processing operations allowing a velocity measurement to be extracted from a delay/Doppler matrix of the type illustrated in FIG. 2.
Figure 6:
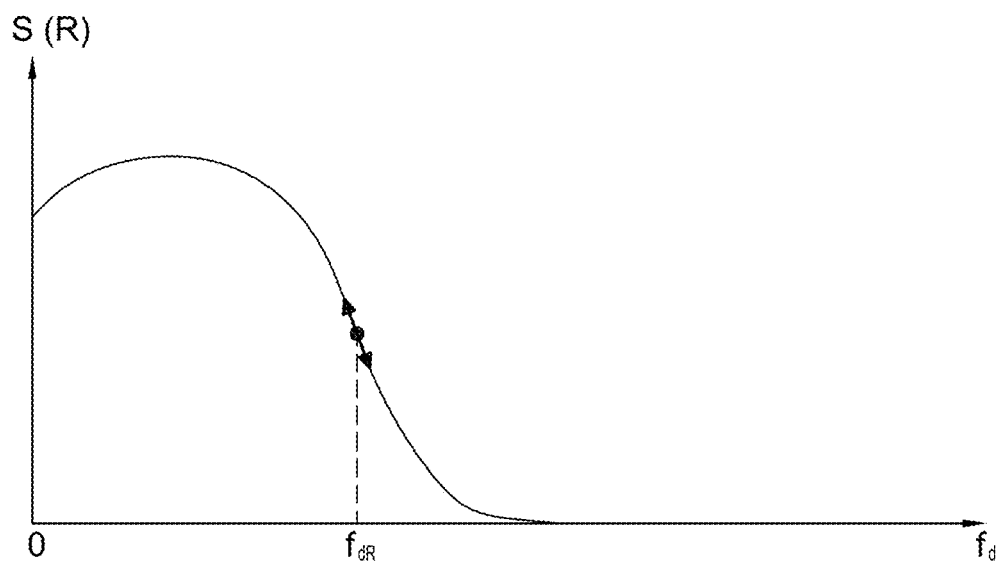
FIG. 6, graphs illustrating various data-processing operations allowing a velocity measurement to be extracted from a delay/Doppler matrix of the type illustrated in FIG. 2.

Considering the zOx plane, it may be seen from FIG. 3C that, for a given radial distance R, the velocity perceived at the point $P_B$ will be lower than the velocity perceived at the point $P_A$: $v_B = v_A \cos(\delta'/2)$. More generally, the radial velocity perceived at a point $P_{R\theta}$ located at the radial distance R from the radar and such that the line that connects it to the origin O makes with the x-axis an angle $\theta \in [-\delta'/2; \delta'/2]$ is equal to $v_{R\theta} = v_A \cos(\theta)$. Thus, there are a plurality of Doppler frequencies measured for a given distance R, this being illustrated in FIG. 5—in which $fd_A$ and $fd_B$ are the Doppler frequencies of the points $P_A$ and $P_B$—and explaining the spread of the spectrum of FIG. 2 in the "Doppler" direction.

Figure 3D:
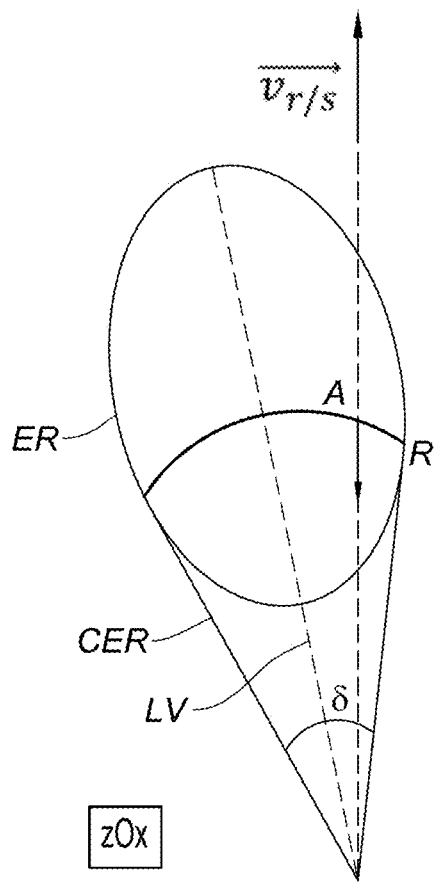
FIG. 3D, a view of the same type as that in FIG. 3C, but in the case where the projection onto the ground of the direction of sight of the radar or sonar is not aligned with the velocity of the carrier.

Up to now, the case where the projection onto the ground of the line of sight has the same direction as the velocity $v_{r/s}$ has been considered. However this is not essential; what counts is that the angle made by the projection onto the ground of the line of sight and the velocity $v_{r/s}$ (and therefore the x-axis) is smaller than $\delta'/2$, such that the footprint EF on the ground is passed through by the projection onto the ground of $v_{r/s}$. This is illustrated in FIG. 3D.

The above considerations will have allowed the digital processing operations that must be implemented to determine the velocity $v_{r/s}$ from a delay/Doppler spectrum of the type illustrated in FIG. 2 to be understood.

Firstly, it is necessary to extract the high cut-off frequency of the Doppler spectrum $f_{dR}$, i.e. the maximum Doppler frequency (or maximum frequency in absolute value, because the radar beam may also be directed in the opposite direction to the velocity vector), corresponding to one or more distance values R (or, equivalently, to one or more delay values $T_R=2R/c$); this allows contributions to the echo signals that originate from points in the footprint EF on the ground that lie solely on the x-axis to be isolated. To do this, it is possible to plot the amplitude S(R) of the echo signal received with a delay $T_R$ as a function of Doppler frequency $f_d$ and to place the cut-off at an inflection point that maximizes the derivative $dS/df_d$. As a variant, any edge-detecting algorithm may be applied; specifically, determining the high cut-off frequency of the Doppler spectrum for all the values of $T_R$ corresponds to finding the top portion of the edge of the high intensity "spot" of the delay/Doppler spectrum of FIG. 2.

If the cut-off frequency thus determined is called $f_{DR}$, the velocity of the carrier measured for the delay $T_R$ corresponding to the distance R is given by:

$$v_{r/s,R} = \frac{c \cdot f_{dR}}{2 f_{em} \cdot \cos(\alpha_R)} \quad \text{[Math. 6]}$$

where $f_{em}$ is the emission frequency of the radar pulses. Taking (2) into account, Equation (3) may also be written $$v_{r/s,R} = \frac{c \cdot f_{dR}}{2 f_{em} \cdot \sqrt{1-\left(\frac{h}{R}\right)^2}} \quad \text{[Math. 7]}$$

Ideally, Equation (3) or (3') should deliver the same result for the velocity $v_{r/s}$ whatever the chosen distance value R. In practice, this is not the case because of the many perturbations that affect the echo signals (for example, obstacles present on the ground, different ground reflectivity levels or simply electronic noise). Therefore, it is advantageous to compute $v_{r/s,R}$ for a plurality of different values of R and to make use thereof to compute a final estimation of the velocity $v_{r/s}$, for example by taking an average or weighted average of the obtained results. It is also possible to compute an index of the quality of the estimation of the velocity—it may for example be a question of the standard deviation $\sigma_V$ of the sequence of estimations corresponding to the various values of R. It is for this reason that having an emission and reception cone with a non-negligible angular aperture in the xOy plane is an advantage. In contrast, the angular aperture in the zOx plane must preferably be minimized as far as is possible given the constraints of the hardware used (typically the size of the radar antenna).

Figure 7:
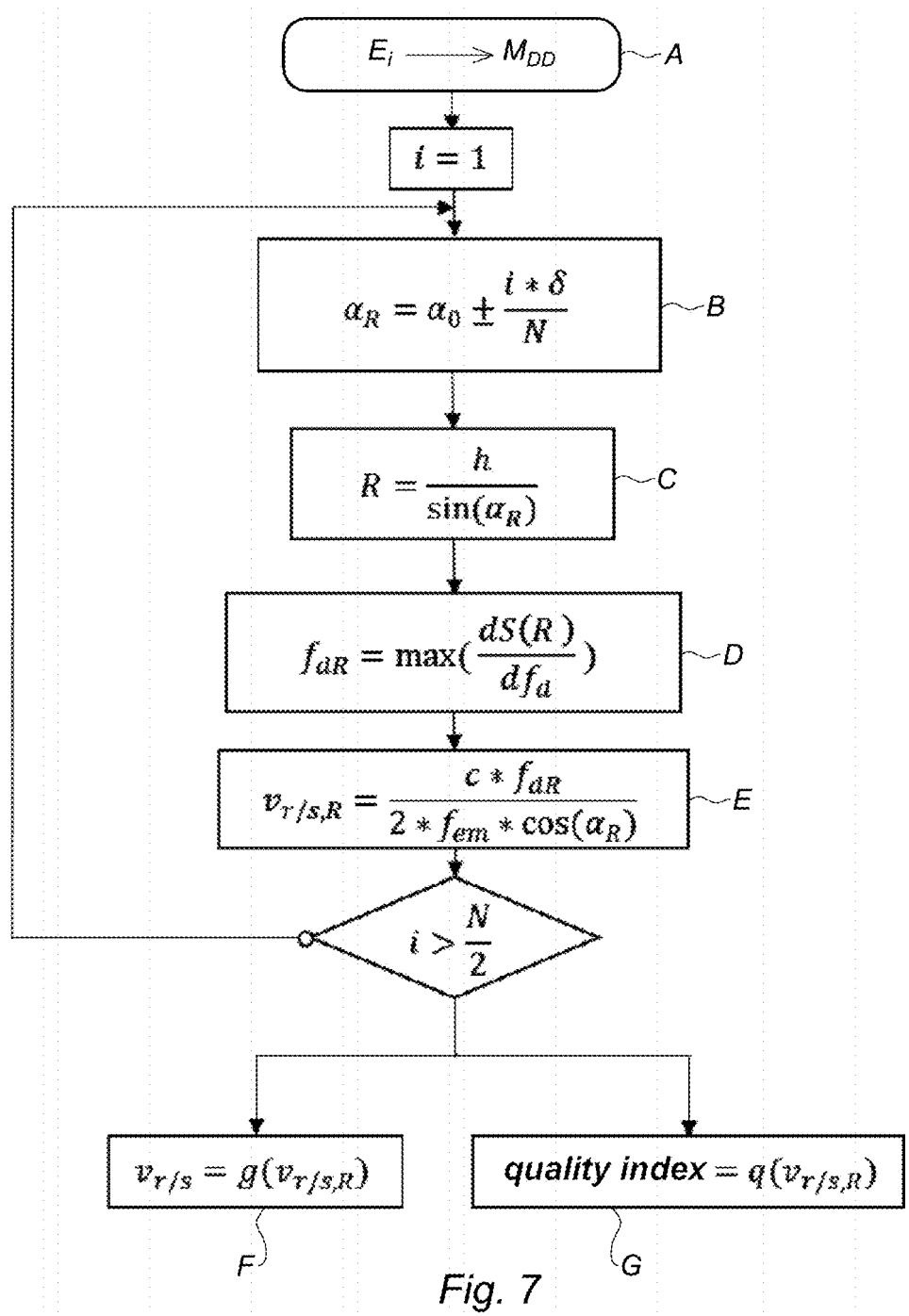
FIG. 7, a flowchart of an algorithm allowing a velocity measurement to be extracted from a delay/Doppler matrix according to one embodiment of the invention.

FIG. 7 illustrates a velocity-measuring algorithm implementing the principles described above. After the echo signals have been acquired and processed to obtain a delay/Doppler matrix (A), N angular values $\alpha_R$ are defined to sample the range $[\alpha_0-\delta'/2; \alpha_0+\delta'/2]$ and the corresponding distances $R=(h/\sin(\alpha_R))$ are computed (C). For each distance value, the high cut-off frequency $f_{DR}$ of the corresponding Doppler spectrum is computed by seeking the maximum of the derivative $dS/df_d$ (D), then Equation (3) or (3') is used to compute $v_{s/r,R}$ (E). These operations are repeated for all the angular values $\alpha_R$. Lastly, the velocity $v_{s/r}$ of the carrier and the index of the quality of the estimation are computed (F) and (G) depending (functions $g(\cdot)$ and $q(\cdot)$) on the values $v_{s/r,R}$.

Figure 8:
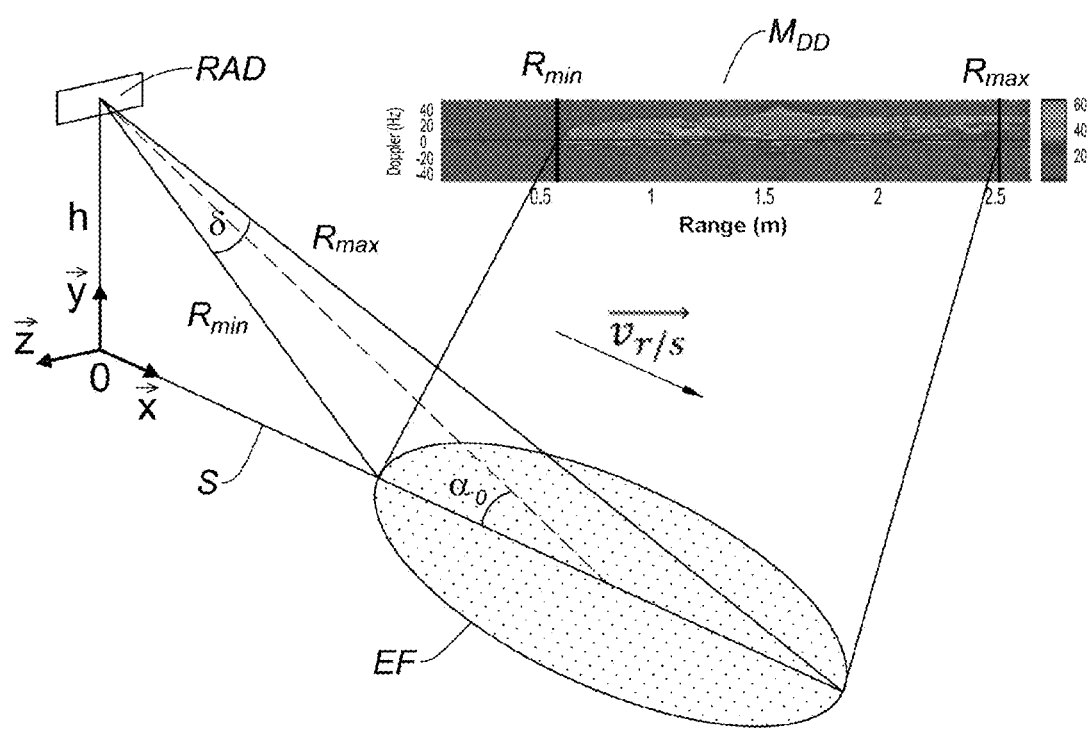
FIG. 8, shows an illustration of the principle of the—optional—measurement of the height of the carrier and of the angle of sight of the radar or sonar.

Application of Equation (3) or (3') presupposes that the height h of the carrier is known, which is not necessarily the case. However, if necessary, this information may be deduced from the delay/Doppler spectrum, as illustrated in FIG. 8.

The minimum distance $R_{min}$ and the maximum distance $R_{max}$ both depend on the height h, which is assumed to be unknown, and on the angle $\alpha_0$, which is also generally unknown:

$$\begin{cases} R_{min} = \dfrac{h}{\sin\left(\alpha_0 + \dfrac{\delta}{2}\right)} \\ R_{max} = \dfrac{h}{\sin\left(\alpha_0 - \dfrac{\delta}{2}\right)} \end{cases} \quad \text{[Math. 8]}$$

If $R_{min}$ and $R_{max}$ are known, h and $\alpha_0$ may be found by solving the system (4). Now, $R_{min}$ and $R_{max}$ are associated with the shortest and longest delay for which the echo signal is "significant" (substantially higher than the noise level), respectively. These two values may be found via a thresholding method: firstly the quantity E(R), which corresponds to the total energy received for a given distance and for positive Doppler frequencies, $E_s(R)=\{\|S(R)\|^2, d\geq 0\}$, is found. This quantity is compared to a threshold in order to determine the distance interval $[R_{min}, R_{max}]$ in which the received energy is significant. It is also possible to use other methods, edge detection for example.

The invention claimed is:

1. A method for measuring the velocity of a carrier vehicle with respect to the ground, the carrier vehicle moving parallel to the ground and being equipped with a radar or sonar having an emission and reception cone about a line of sight, the method comprising the following steps:
    (a) orienting the line of sight of the radar or sonar toward the ground, such that a footprint on the ground of said emission and reception cone is passed through by the projection onto the ground of the velocity vector of the carrier vehicle;
    (b) using the radar or sonar to emit a plurality of signals that are directed toward the ground, and to acquire respective echo signals at a plurality of echo delay time values;
    (c) processing the acquired echo signals so as to obtain, for one or more of the plurality of echo delay time values, a corresponding Doppler spectrum;
    (d) for said one or more echo delay time value, identifying an uppermost, in absolute value, frequency value of the corresponding Doppler spectrum; and
    (e) computing the velocity of the carrier vehicle with respect to the ground as a function of: its height with respect to the ground, said one or more uppermost frequencies and the corresponding echo delay time values.

2. The method as claimed in claim 1, wherein:
    step c) comprises processing the acquired echo signals so as to obtain a said Doppler spectrum for each of the plurality of echo delay time values;
    step d) comprises determining a plurality of said maximum frequencies for a plurality of said Doppler spectra; and
    step e) comprises computing the velocity of the carrier vehicle with respect to the ground as a function of its height with respect to the ground and of a plurality of said maximum frequencies.

3. The method as claimed in claim 2, wherein step e) also comprises computing an index of confidence in the velocity measurement as a function of a plurality of said maximum frequencies.

4. The method as claimed in claim 2, wherein step c) comprises constructing a delay-Doppler matrix and step d) comprises applying an edge-detection algorithm to said matrix.

5. The method as claimed in claim 1, wherein, in step d), said or each maximum frequency is determined by identifying a maximum of the derivative of the corresponding Doppler spectrum with respect to frequency.

6. The method as claimed in claim 1, wherein step e) comprises, for said one or more echo delay time value, designated $T_R$, computing a velocity given by:

$$V_{r/s,R} = (c \cdot f_{DR})/(2 f_{em} \cdot \cos(\alpha_R))$$

where:
 c is the propagation speed of the signal emitted by the radar or sonar;
 $f_{DR}$ is the maximum frequency of the Doppler spectrum corresponding to the delay $T_R$;
 $f_{em}$ is the frequency of the signal emitted by the radar or sonar;
 $\alpha_R = \sin^{-1}(2h/c \cdot T_R)$, h being the height of the carrier vehicle with respect to the ground; and
 wherein said velocity of the carrier vehicle with respect to the ground is determined depending on one or more of the velocities $v_{r/s,R}$ thus computed.

7. The method as claimed in claim 1, wherein the emission and reception cone has an aperture angle in a plane perpendicular to the ground and containing the line of sight comprised between 40° and 80°.

8. The method as claimed in claim 1, also comprising a step d') comprising processing the acquired echo signals so as to determine a maximum and minimum value of the echo delay time values of said echo signals, and to deduce therefrom an estimation of the height h of the carrier vehicle with respect to the ground and of the angle made by the line of sight and the ground.

9. The method as claimed in claim 1, wherein, in step a), the beam is directed obliquely toward the ground.

10. A system for measuring the velocity of a carrier vehicle with respect to the ground by means of a method as claimed in claim 1, comprising:
 a radar or sonar having an emission and reception cone about a line of sight that is configured to be oriented toward the ground; and
 a device comprising at least one of a processor or a dedicated electronic circuit for processing echo signals acquired by said radar or sonar;
 wherein said device is configured to:
 process the acquired echo signals so as to obtain, for said one or more echo delay time values, the corresponding Doppler spectrum;
 for said or at least one said echo delay time value, determine the maximum, in absolute value, frequency value of the corresponding Doppler spectrum; and
 compute the velocity of the carrier vehicle with respect to the ground as a function of a datum indicative of its height with respect to the ground, of said one or more maximum frequencies and of corresponding delay time values.

* * * * *